May 31, 1927.

W. G. ALDEEN 1,630,883

HINGE MAKING MACHINE

Filed March 10, 1924   9 Sheets-Sheet 1

Inventor
Wilhelm G. Aldeen
By Churchill Parker Rubin
Attys

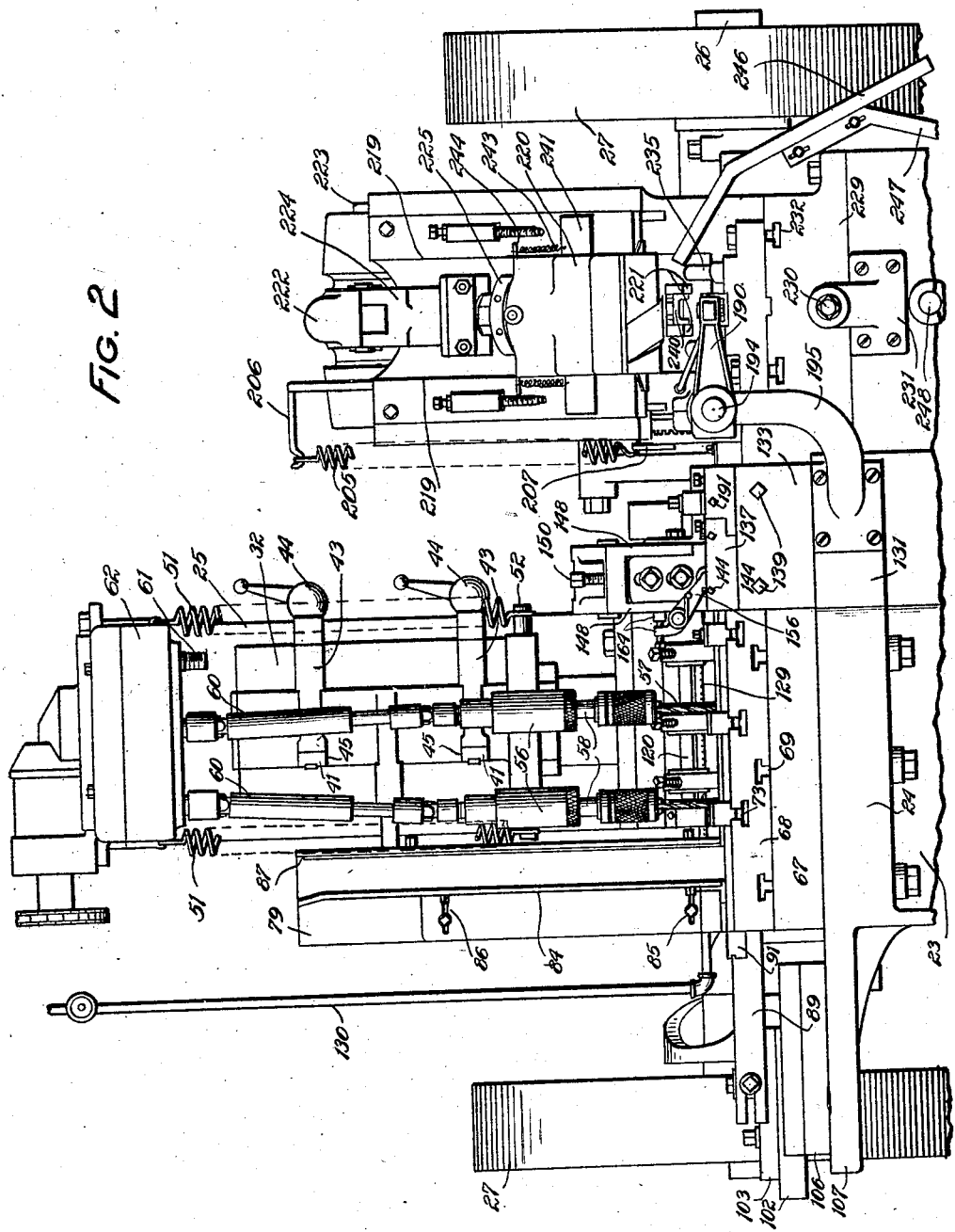

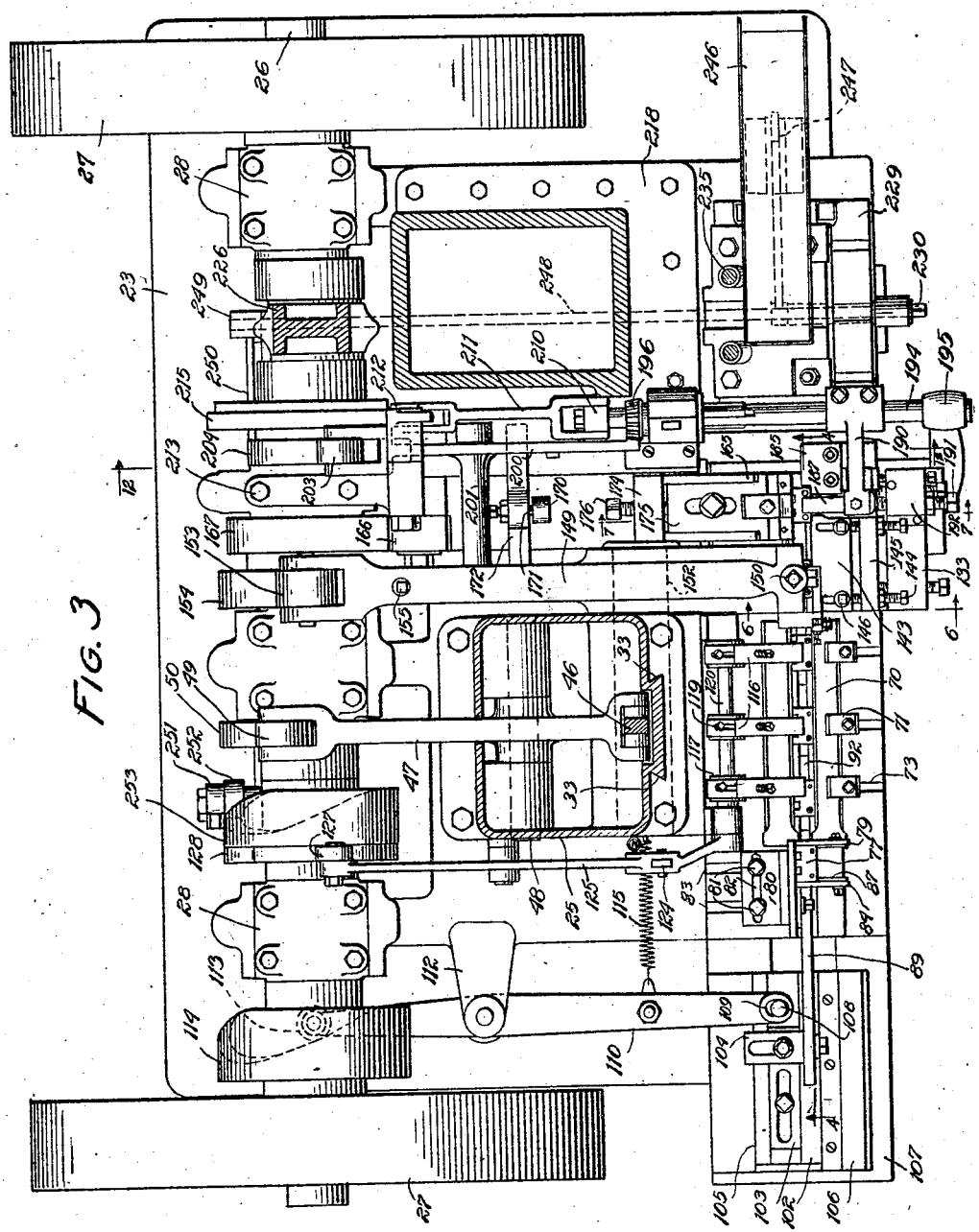

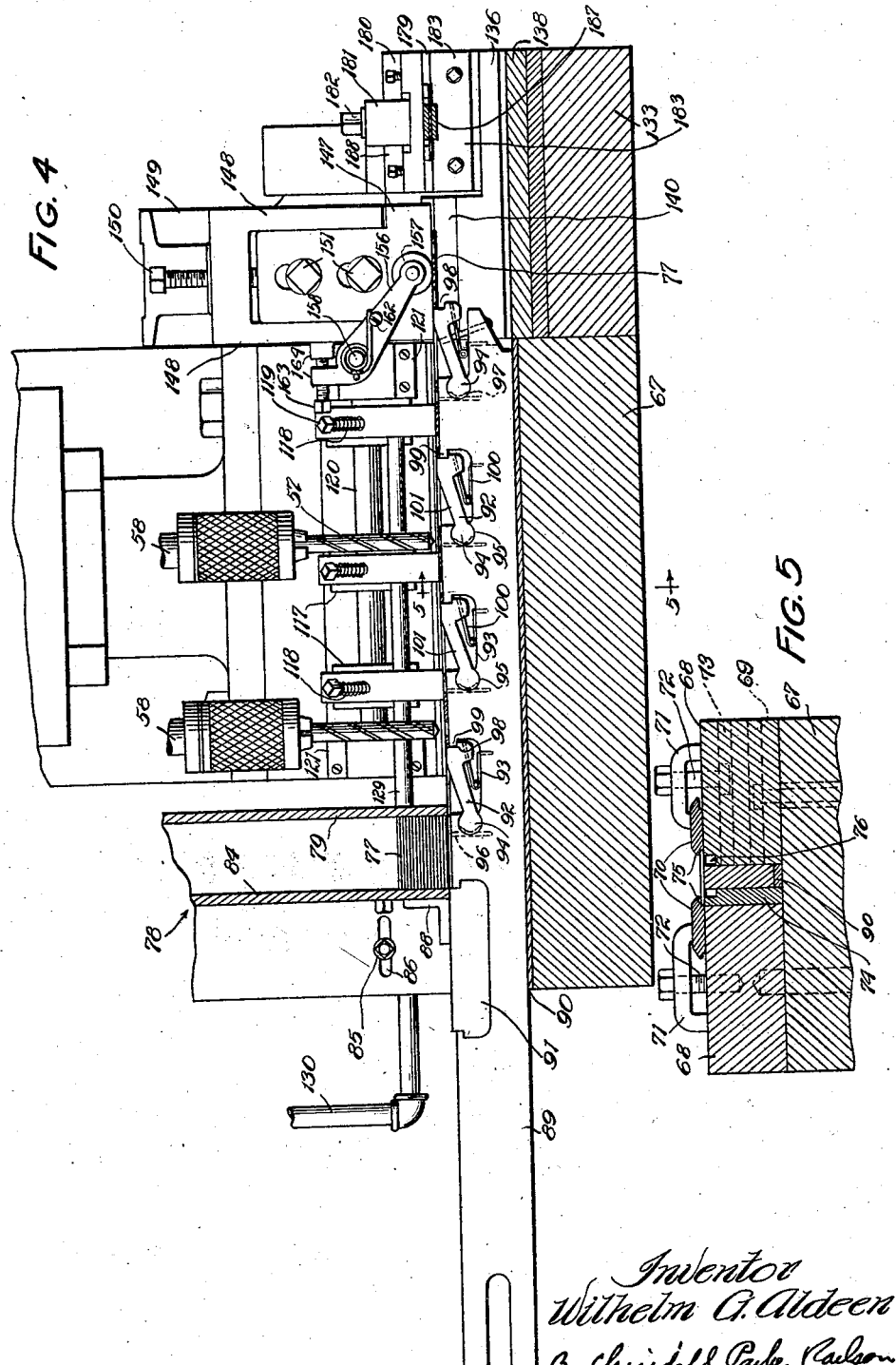

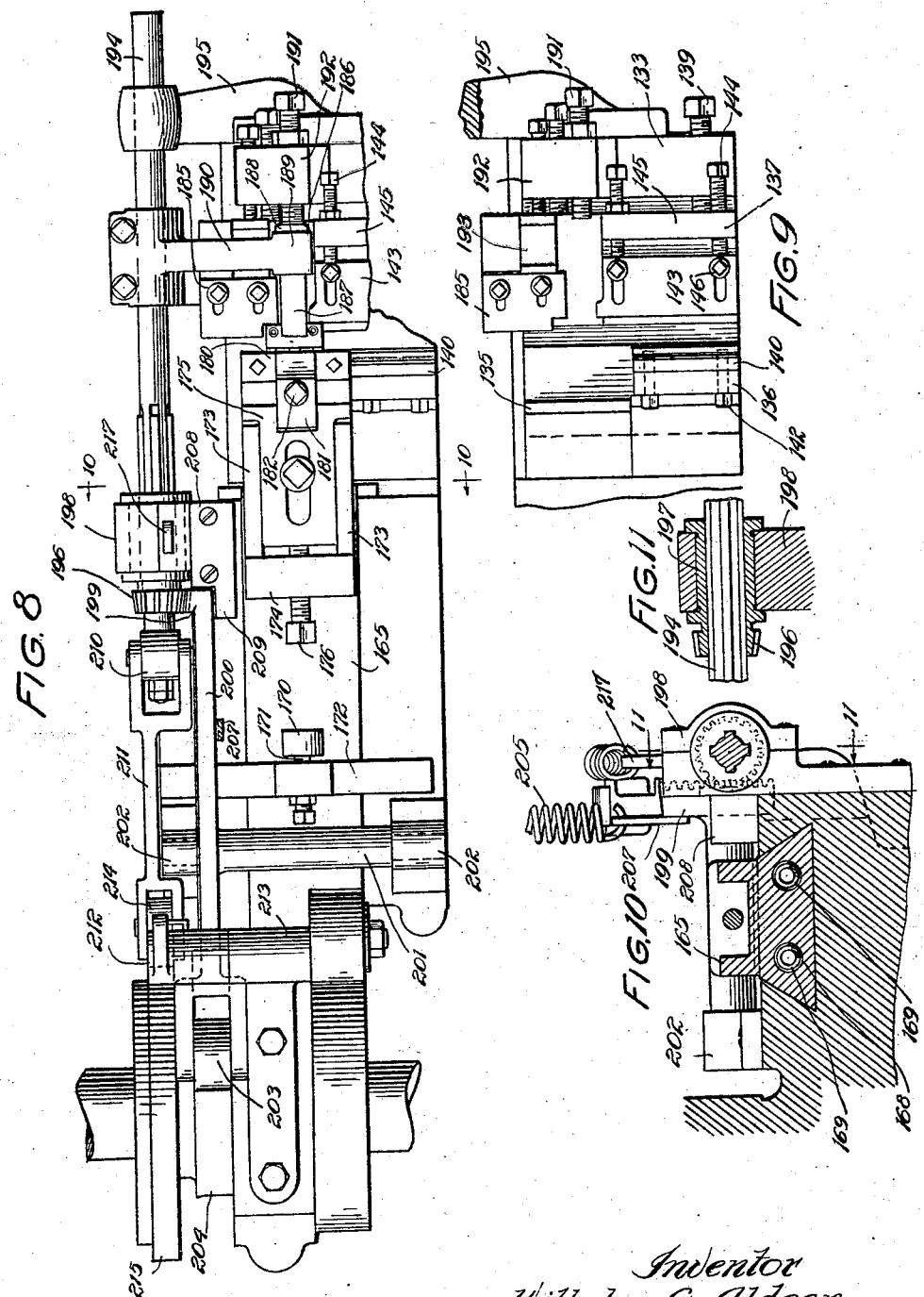

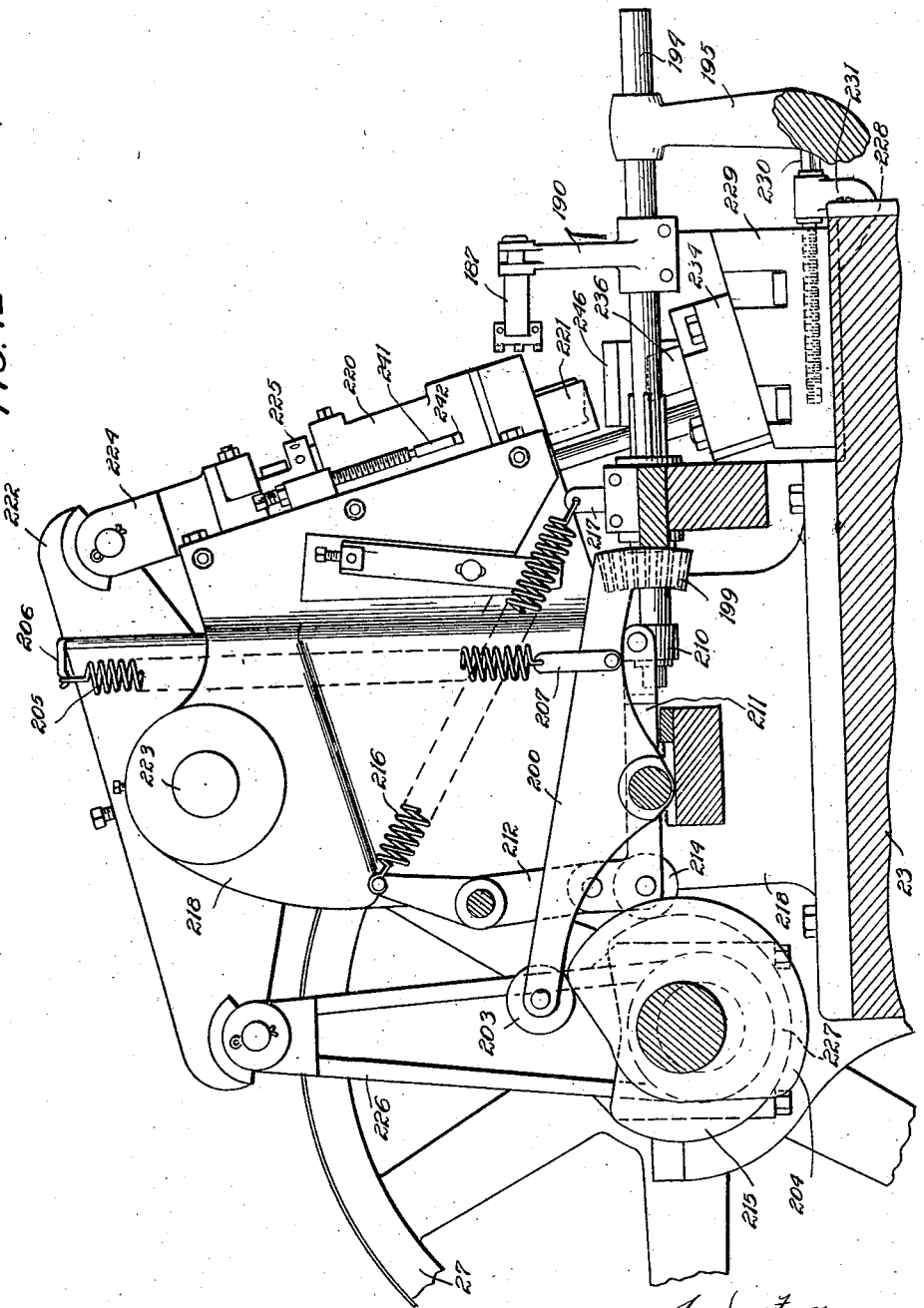

May 31, 1927.

W. G. ALDEEN 1,630,883

HINGE MAKING MACHINE

Filed March 10, 1924

Inventor
Wilhelm G. Aldeen
By Chindall Parker Carlson
Attys

May 31, 1927.
W. G. ALDEEN
1,630,883
HINGE MAKING MACHINE
Filed March 10, 1924    9 Sheets-Sheet 9
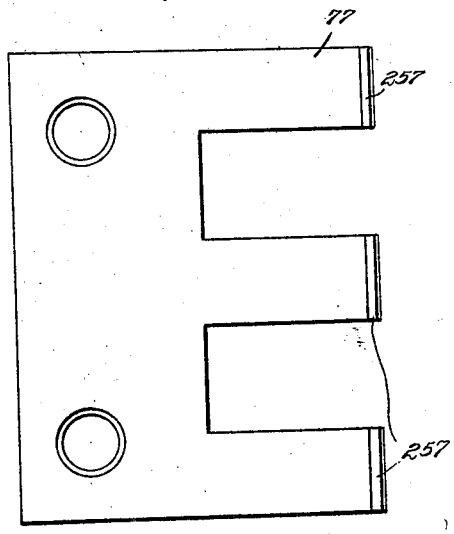
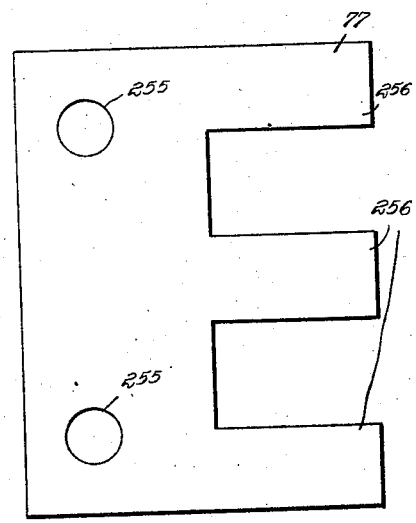
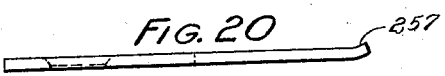
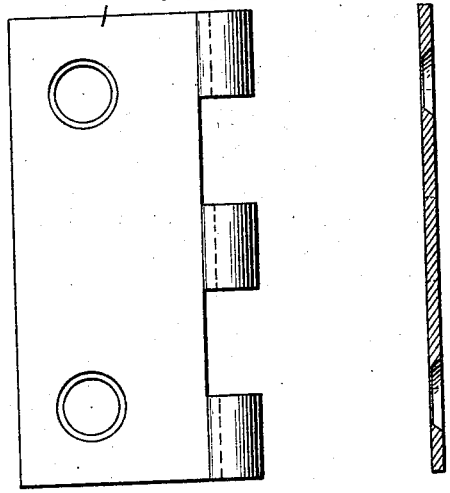
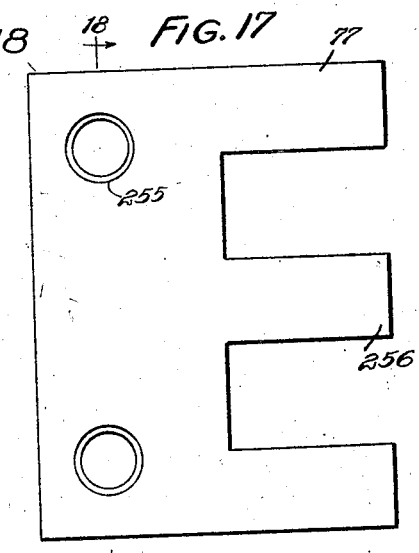
Inventor
Wilhelm G. Aldeen
By Churchill Parker Carlson
Attys Patented May 31, 1927.

1,630,883

UNITED STATES PATENT OFFICE.

WILHELM G. ALDEEN, OF ROCKFORD, ILLINOIS, ASSIGNOR TO NATIONAL LOCK CO., OF ROCKFORD, ILLINOIS, A CORPORATION OF DELAWARE.

HINGE-MAKING MACHINE.

Application filed March 10, 1924. Serial No. 698,336.

This invention relates to automatic hinge-making machines, and has particular reference to machines for automatically and successively performing a plurality of operations on a hinge blank.

The primary object of this invention is to provide an automatic hinge-making machine whereby high speed or quantity production can be obtained, and in which manual handling of the work blanks is entirely obviated.

Another object is to provide a complete unitary hinge-making machine in which a plurality of automatic operations are performed in timed sequence on the work blanks during their travel through the machine.

A general object is to provide an automatic hinge-making machine in which a plurality of units for performing different parts of the operation are connected by suitable means with a single power shaft whereby they are driven in timed relation to each other to perform a sequence of operations upon each blank.

A further object is to provide an automatic hinge machine in which a continuous series of work blanks are incrementally advanced through the machine to be successively countersunk, curled, trimmed, and discharged by a plurality of operating units driven in synchronism.

A more detailed object is to provide a unitary hinge-making machine in which a series of work blanks are continuously fed step by step through a mechanism for countersinking the bores, a primary and secondary curling mechanism for forming the curls in two steps, and a trimming mechanism for trimming the ends of said curls, and in which these operating parts are actuated in timed relation to each other and to the movements of the work blanks, whereby the hinges are automatically and progressively fashioned.

Still another object resides in the provision of a novel feeding mechanism for advancing the work blanks through the machine in successive steps, said feeding mechanism being driven in timed relation to the elements for operating on the blanks.

A further object is to provide a novel device for transferring the work blanks individually from the curling mechanism to the trimming mechanism, and inverting them during said transfer.

Another object is to provide a novel discharge means which automatically and periodically moves into position to receive the finished blanks, and then discharges them from the machine.

Further objects and advantages will become apparent as the description proceeds.

In the drawings, Figure 1 is a side elevation of a complete machine embodying the features of my invention.

Fig. 2 is a front view of the machine with a portion of the base broken away.

Fig. 3 is a plan view of the machine with the countersinking mechanism and the trimming mechanism shown partly in horizontal section.

Fig. 4 is a fragmentary vertical sectional view taken in the plane of line 4—4 of Fig. 3, and showing primarily the work feeding mechanism.

Fig. 5 is a sectional detail view taken in the plane of line 5—5 of Fig. 4.

Fig. 8 is a fragmentary plan view of the means for performing the final step in the curling operation, and of the transfer mechanism.

Fig. 9 is a fragmentary plan view showing details of the means for performing the final step in the curling operation, the curling slide and the transfer arm being removed.

Fig. 10 is a sectional view taken in the plane of line 10—10 of Fig. 8.

Fig. 11 is a detail sectional view taken in the plane of line 11—11 of Fig. 10.

Fig. 12 is a side elevation, partly in section, along line 12—12 of Fig. 3, showing the mechanism for trimming the ends of the curls formed on the work blanks.

Fig. 16 is a plan view of the hinge blank as it appears when fed into the machine.

Fig. 17 is a view similar to Fig. 16 of the blank after the apertures therein have been countersunk.

Fig. 18 is a sectional view of the blank taken along line 18—18 of Fig. 17.

Fig. 19 is a plan view of the blank after the apertures therein have been countersunk and the first step in the curling operation has been performed.

Fig. 20 is an end view of the blank shown in Fig. 19.

Fig. 21 is a plan view of the blank as it appears when the machine operation has been completed.

Fig. 22 is an end view of the blank shown in Fig. 21.

Figure 1:
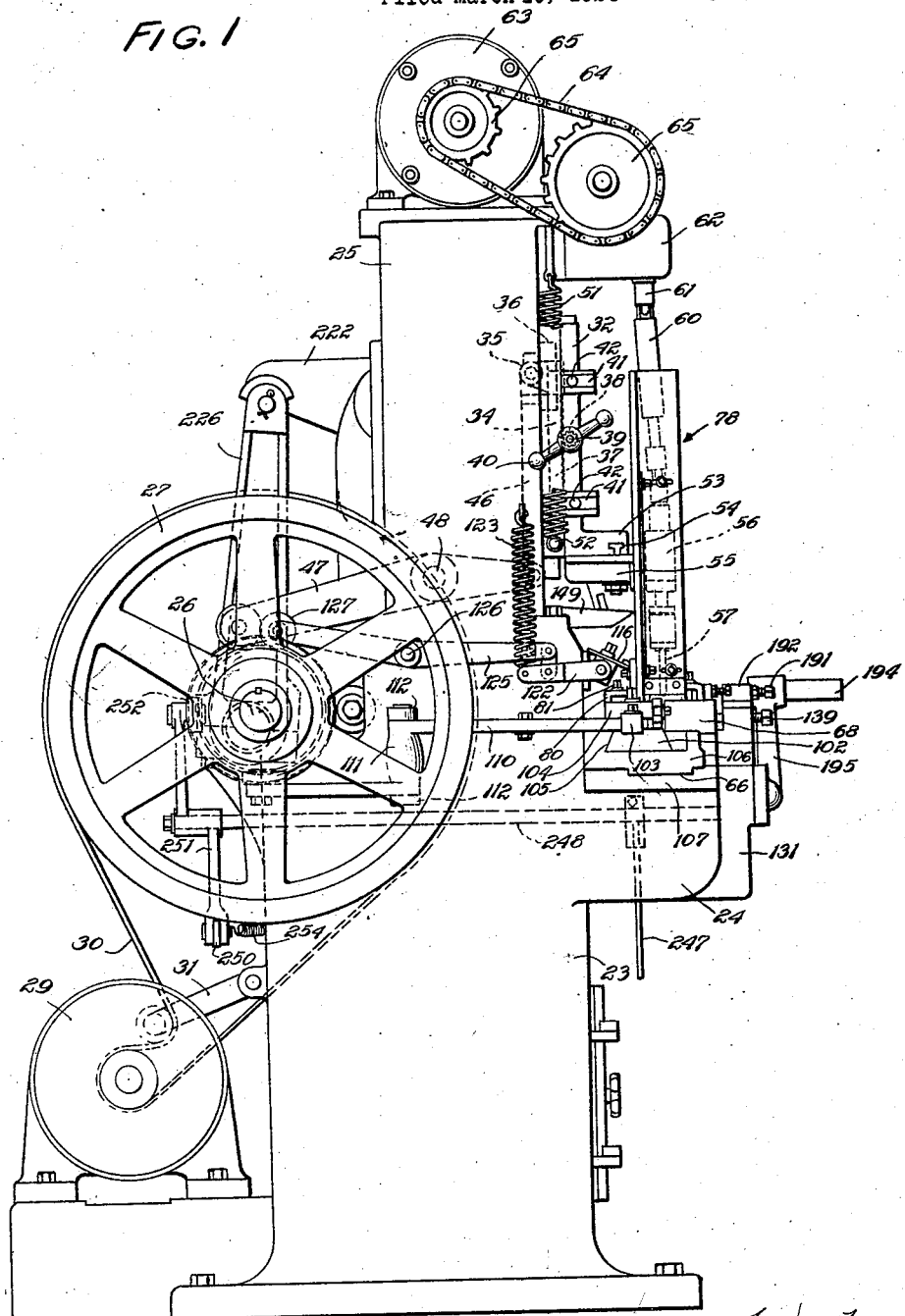

While my invention is susceptible of various modifications and alternative constructions, I have illustrated in the drawings and will herein describe in detail the preferred embodiment thereof, but it is to be understood that I do not thereby intend to limit the invention to the precise construction disclosed, but aim in the appended claims to cover all other legitimate modifications and alternative constructions falling within the spirit and scope of the invention.

*Brief description of machine as a whole.*

A brief explanation of the general construction and operation of the machine will facilitate an understanding of the more detailed description to follow.

The machine comprises generally a hollow base casting which is provided at one end with a vertical standard on which is mounted the reciprocating drill head of a countersinking mechanism. A curling mechanism, which is constructed of two parts for performing respectively the initial and the final steps in the curling operation, is supported on the base next to the countersinking mechanism. Mounted on the other end of the base casting is a mechanism for trimming the ends of the hinge curls.

A horizontal knee is formed on the front of the machine base, and constitutes a support for a work table adapted to support and guide the work blanks during their passage through the countersinking and curling mechanisms. The work blanks are fed one by one to the work table from an appurtenant magazine, and are advanced along the table step by step by means of a feeding mechanism mounted on an end extension of the knee.

A transfer device is mounted on the base casting between the curling mechanism and the trimming mechanism, and comprises fingers for engaging a work blank during the final curling operation, and thereafter transferring it into an inverted position on the bolster block to be trimmed.

Mounted on the rear portion of the base is a horizontal main drive shaft to which are secured a plurality of driving elements or cams having operative connections respectively with the drill head of the countersinking mechanism, the movable members of the curling mechanism, the reciprocating member of the feed mechanism, the transfer device, and the punch slide of the trimming mechanism for driving them in timed relation to each other to perform a sequence of operations upon each work blank.

The countersinking mechanism comprises a carriage which is mounted for vertical reciprocation on ways formed on the front side of the standard, and is operatively connected to the cam shaft through a vertical link secured at its lower end to one end of a cam lever pivotally mounted in the standard. A plurality of spaced vertical drills are supported by the carriage directly over the work table, and are selectively arranged and adjusted into positions directly over different holes in the work blanks for successive positions of the work table. These drills are driven by a plurality of flexible extensible shafts connected through suitable gearing with an electric motor mounted on top of the standard.

The primary curling mechanism comprises a curl lever, the rear end of which is operatively associated with the cam shaft, and the front end of which carries an adjustable die, positioned directly over a curling block on the work table adapted to receive the work blanks. The die and block are formed with complementary surfaces shaped to form the initial part of the curl. The secondary curling mechanism comprises a curl slide which is associated at its rear end with the cam shaft, and carries a die block at its forward end. The die block is formed with a horizontal semi-spherical groove for engaging the intial part of the curl on the blank to complete the curling operation.

The trimming mechanism comprises a punch slide which is operated by the cam shaft through a slide arm mounted in the press frame. An adjustable bolster block is positioned directly below the slide and is adapted to receive the work blanks from the transfer device. The slide carries a punch which is movable into engagement with the work blank on the bolster block to sheer the ends of the curls. An ejector carried by the slides operates to knock off the blank into a discharge chute which is periodically moved into a position beneath the punch.

*Detailed description.*

Referring now more particularly to the specific construction of the exemplary embodiment of the invention, the machine comprises a hollow base casting 23 formed on its front side with a horizontal knee 24 and provided on its left end with a vertical standard 25. A unitary power shaft 26 having a fly wheel 27 on each end is journaled in bearings 28 secured to the base 23 at the rear of the standard 25. The shaft 26 is driven by a small electric motor 29 mounted at the rear of the base casting 23, through a belt 30 traveling over one of the fly wheels 27. Proper tension of the belt 30 is maintained by an idler mechanism 31 of common construction which is pivotally secured to the rear wall of the base. The shaft 26 carries a plurality of driving elements for operating the different units of the machine in timed relation to each other in a manner to be hereinafter described.

*Countersinking mechanism.*

Referring particularly to Figs. 1, 2 and 3, a drill head comprising a carriage 32 is slidably mounted on vertical ways 33 formed on the front wall of the standard 25. A vertical rack bar 34 provided at its upper end with a lateral arm 35 which projects rearwardly through a vertical slot 36 in the forward wall of the standard 25 slidably engages with a dove-tailed groove 37 formed in the rear face of the carriage 32. The relative position of the carriage 32 and the rack bar 34 may be adjusted by a pinion 38 which engages the rack bar 34 and is supported by a horizontal shaft 39 journaled in the carriage 32 and having a handle 40 secured to its outer end. A plurality of clamps 41 are rotatably secured to a like number of screws 42 which are adjustably mounted in journals 43 formed on the carriage 32 and are provided with handles 44 at their outer ends. The clamps are positioned in notches 45 formed in one wall of the groove 37 and engage one dove-tailed side of the rack member 34 to lock the latter from movement relative to the carriage 32. The arm 35 is connected to the upper end of a vertical connecting link 46, the lower end of which is pivotally secured to the forward end of a lever 47 pivotally mounted on a horizontal pin 48 within the standard 25. At its rear end the lever 47 is provided with a cam roller 49 which is arranged to continually engage the working face of a countersink cam 50 mounted on the shaft 26. The cam roller 49 is maintained in continual engagement with the cam 50 by two coiled springs 51 secured at their upper ends to opposite sides of the standard 25, and at their lower ends to lateral projections 52 formed on the carriage 32. The springs resist the downward movement of the carriage and serve to prevent backlash and lost movement between the connecting posts. By this construction, for each revolution of the shaft 26, the cam 50 will oscillate the lever 47 to reciprocate the carriage 32 a predetermined extent in a position determined by the relative adjustment of the carriage and the rack bar 34.

At the lower end, the carriage 32 is provided with a forwardly extending shelf 53 which is formed with a T-slot 54 on its under side for adjustably supporting a bracket 55. A plurality of spaced journals 56 adapted to support any desired number of drills 57 and their vertical spindles 58 are adjustably secured to the bracket 55. Preferably the journals are provided with knurled nuts 59 for vertically adjusting the spindles 58. The upper ends of the spindles 58 are flexibly connected with a series of extensible shafts 60 which are similarly connected to a plurality of studs 61 journaled in a casing 62 on the standard 25. Although any other suitable source of power may be provided, the studs 61, in the present instance, are driven by an electric motor 63 adjustably mounted on the head of the standard 25, and operatively connected with the studs through a suitable gear mechanism (not shown) and a sprocket chain 64 and wheels 65. It will be apparent from the above construction that the drills 57 are universally adjustable into any desired spaced relation, and may be driven continually by the motor 63 throughout their vertical reciprocation by the cam shaft 26.

The horizontal knee 24 formed on the front side of the base casting 23 is provided with a longitudinal guideway 66 for supporting a work table 67 directly below the drills 57. Mounted on opposite sides of the table 67 are a pair of guide blocks 68. The front block is provided with a plurality of transverse T-slots 69 on its under side whereby it may be adjustably secured to the table 67 in different lateral positions for the purpose of altering the width of the passage between the blocks. A pair of guide strips 70 are secured along the adjacent edges of the guide blocks 68 by means of a plurality of strips 71 which are clamped in place by bolts 72. The front guide block 68 is formed with a plurality of transverse T-slots 73 in its upper side to allow for adjusting the straps 71 associated therewith into different lateral positions. A third guide strip 74 is positioned against the inner face of the rear guide block 68. The guide strips 70 are formed with longitudinal notches 75 along their lower edges, and are so positioned that their adjacent notches overlie respectively the upper edge of the guide strip 74 and the inner edge of the front guide block 68, thereby forming a narrow horizontal guideway 76 throughout the length of the work table 67.

*Work-blank magazine*

Work blanks 77 are fed into the guideway 76 from a magazine 78 which is mounted on the left end of the work table 67. The magazine comprises an angle iron 79 which is vertically positioned with one leg extending across the guideway 76. The other leg is secured to a holder 80 which is mounted on the inner bearing block 68. A pair of bolts 81 extending through an elongated slot 82 in the holder 80 and engaging several transverse T-slots 83 in the upper side of the inner block 68 serve to clamp the holder in any adjusted position. An angle iron 84 having one leg extending across the guideway 76 in parallel spaced relation to the transverse leg of the angle iron 79 is adjustably secured to the rear leg of the latter by bolts 85 extending through horizontal slots 86. The transverse legs of the angle irons cooperate to form the sides of a channel for supporting a stack of work blanks 77, and may be relatively adjusted to vary the width of the channel for different sized blanks. Narrow guide strips 87 are secured to the forward edges of the inner sides of the channel to keep the work blanks in vertical alinement, and may be adjusted into different positions to vary the effective depth of the channel. Secured to the transverse leg of the angle iron 84 is a third angle iron 88, one leg of which is horizontally positioned flush with the lower end of the magazine to provide a guide for facilitating approach to the lower edge of the magazine.

Feeding mechanism.

Means is provided for periodically ejecting a work blank from the magazine 78, and advancing it step by step into different positions along the guideway 76 to be operated upon progressively by the successive drills and dies in the countersinking and curling mechanisms. In the present instance, I have provided an elongated feed bar 89 which is slidably mounted between the guide strip 74 and the front bearing block 68, and below the guideway 76. A bearing plate 90 is positioned below the feed bar 89. The feed bar carries a primary feed finger 91 which is positioned directly below the magazine 78. The upper edge of the feed finger 91 projects slightly above the feed bar, and in its forward stroke is adapted to engage the lowermost work blank 77 to feed it from the magazine 78 into the guideway 76 on the work table, and to advance it into a position wherein one of its apertures is positioned directly below the first drill 57. The angle iron 88 overlies the feed finger 91 throughout its reciprocation thereby ensuring smoothness of feed, and avoiding wear and jamming. A plurality of secondary feed fingers 92 for advancing the work blanks 77 from their first position into succeeding positions along the guideway 76 are movably mounted in cut-out portions 93 located at uniformly spaced positions along the feed bar 89 ahead of the primary feed finger 91. Since the secondary feed fingers are alike in construction and mounting, a description of one will suffice. Each secondary feed finger 92 is provided with an enlarged circular end 94 which is movably positioned in a similarly shaped opening 95 communicating at its forward side with the rear end of the cut-out portion 93. Unwarranted removal of the finger 92 is prevented by a pin 96 extending downwardly into the feed bar 89 and engaging in a slot 97 formed in the rear edge of the circular end 94. The forward end of the feed finger is provided with a notch 98 which is adapted to engage a rearwardly extending projection or stop 99 formed on the bar 89. A spring 100 serves to hold the forward end of the finger in its uppermost position. The upper edge of each feed finger is inclined downwardly and rearwardly as indicated at 101. It will be apparent that at the forward stroke of the feed bar 89, the forward edge of the feed finger will engage the rear edge of the adjacent work blank 77 to move the latter into the next position, and that on the return stroke the inclined upper edge 101 will engage the forward edge of the following work blank 77 to depress the finger and cause it to pass rearwardly beneath said last mentioned blank.

To reciprocate the feed bar 89, a base slide 102 is operatively connected with the slotted rear end thereof through a block 103 longitudinally adjustable on the slide and a clamp 104 transversely adjustable on the block. The slide 102 is mounted for reciprocation in ways 105 which are formed on a base plate 106 supported by an extension 107 of the knee 24. At its forward end the base slide 102 carries a stud 108 which loosely engages in an oblong opening 109 formed in the forward end of a feed lever 110. The feed lever 110 is provided with a central bearing 111 which is pivotally mounted between a pair of vertically spaced arms 112 extending outwardly from the side of the base casting 23. At its other end, the feed lever carries a roller 113 which engages the working face of a feed cam 114 mounted on the shaft 26. A spring 115 secured at one end to the base casting is attached to the forward end of the lever 110, and serves to keep the cam roller 113 in continual engagement with the cam 114. By this construction the cam 114 effects a quick and positive withdrawal of the feed bar 89, whereas the spring 115 provides a yielding forward movement of the bar to advance the work blanks along the guideway 76, thereby preventing jamming when a work blank becomes stuck.

Directly after each forward stroke of the feed bar 89, the work blanks 77 are selectively clamped in place by a plurality of brake arms 116. These arms are supported by individual holders 117 to which they are resiliently secured by a plurality of coil springs 118 carried by bolts 119. The holders 117 are secured to a horizontal rock shaft 120 which is suitably mounted in bearings 121 at the front of the machine. A lever 122 is provided at one end of the shaft 120, and is connected at its outer end with a coil spring 123 affixed to the standard 25. The lever 122 is also connected through a link 124 with the forward end of a brake lever 125 centrally pivoted at 126. At its rear end, the lever 125 carries a cam roller 127 positioned to engage a brake operating cam 128 mounted on the shaft 26. It will be seen that the spring 123 serves to rock the shaft 120 to rotate the arms 116 resiliently into engagement with the work blanks 77, and that the cam 128 acts to periodically release the blanks after each operation.

The drillings are removed and the drills somewhat cooled by compressed air which is discharged from a perforated pipe 129 connected with an air line 130.

The countersinking mechanism which I have herein described is similar in many respects to that described in my copending application Serial No. 583,177, filing date August 21, 1922, which includes broad claims reading on the present construction.

The curling mechanism.

Figure 6:
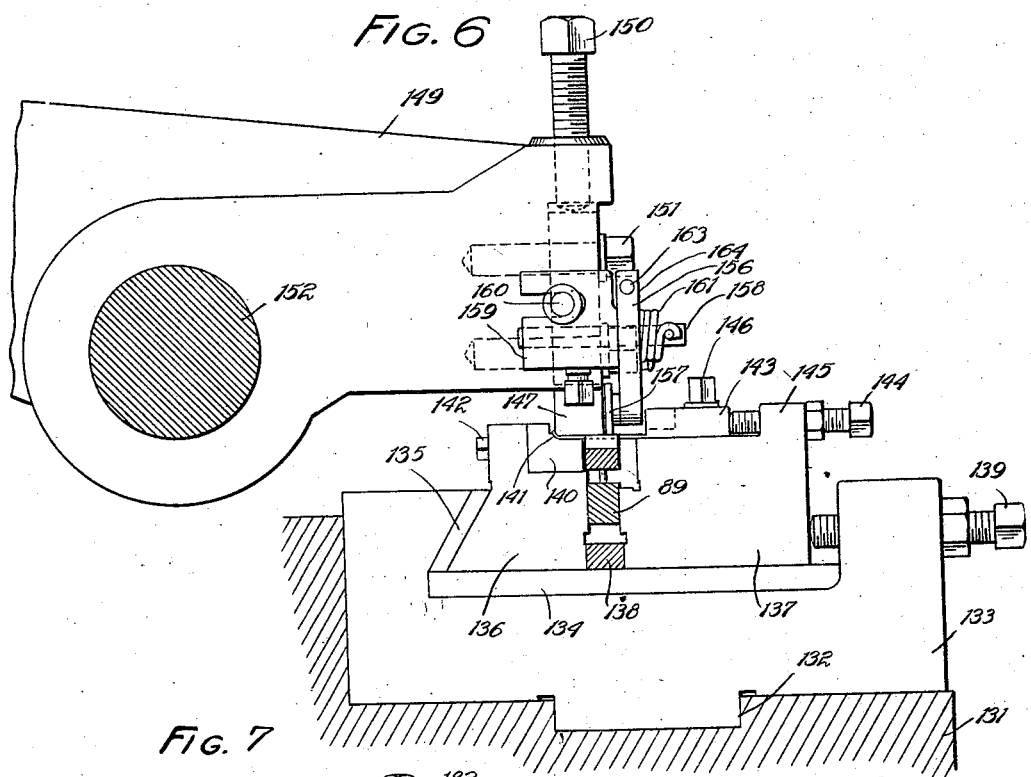
Fig. 6 is a sectional view taken in line 6—6 of Fig. 3, and showing the mechanism for performing the first step in the curling operation.
Figure 7:
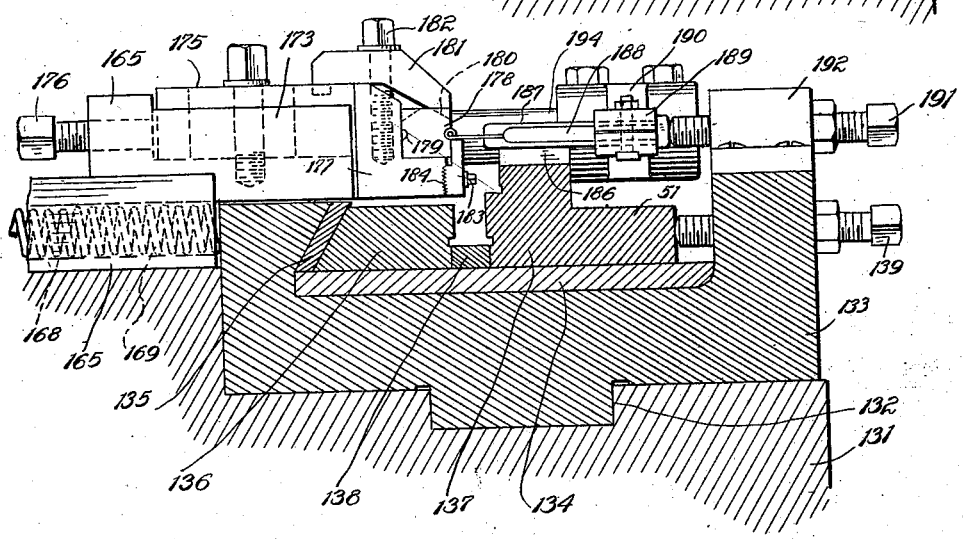
Fig. 7 is a sectional view taken along line 7—7 of Fig. 3 showing the mechanism for performing the final step in the curling operation.
Figure 13:
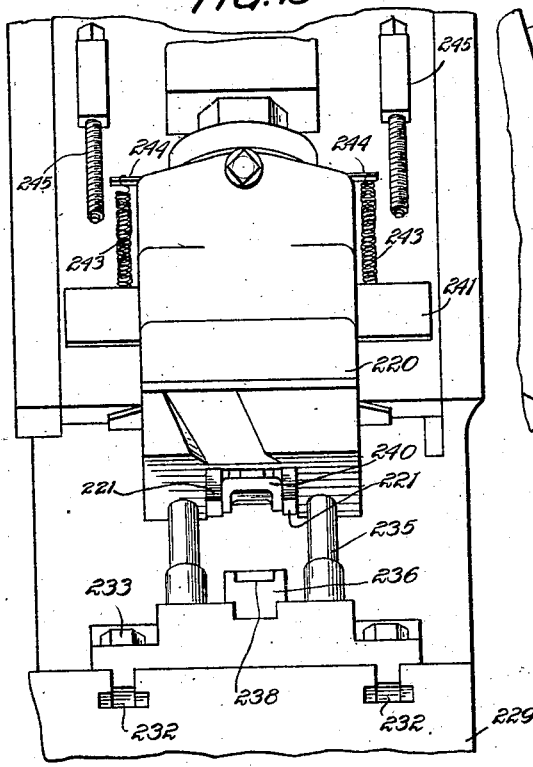
Fig. 13 is a fragmentary front view of the mechanism shown in Fig. 12.
Figure 14:
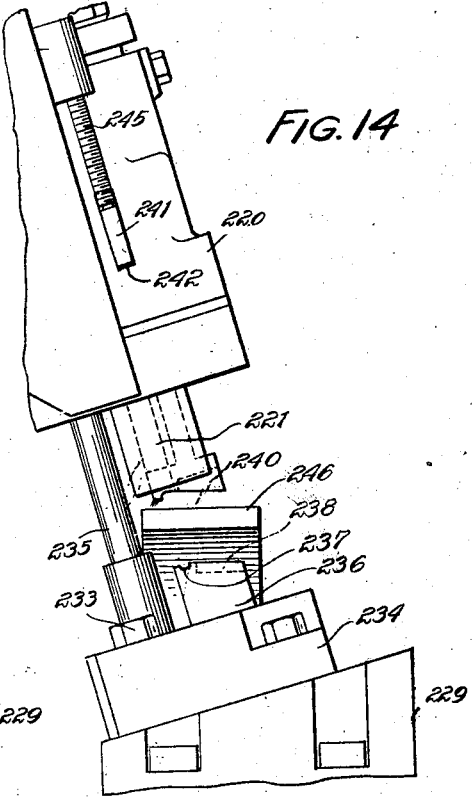
Fig. 14 is a fragmentary side view of the construction shown in Fig. 13.
Figure 15:
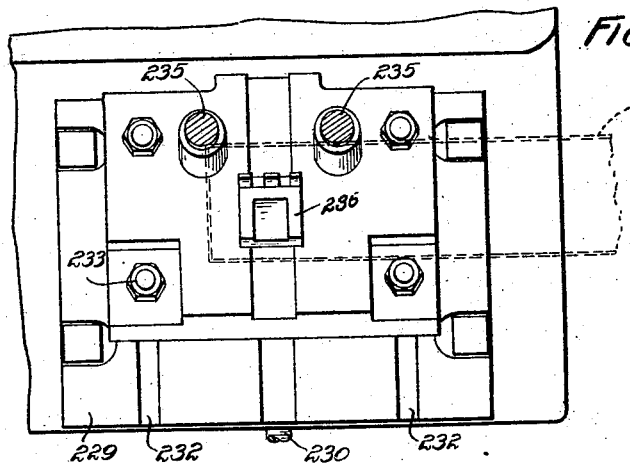
Fig. 15 is a plan view of the bolster construction forming part of the trimming mechanism for supporting the work blank during the punching operation.

Referring now particularly to Figs. 3, 6 and 7, the curling mechanism comprises two parts for acting successively upon the work blanks to perform the curling operation in two steps.

The knee 24 is formed with a forward extension 131 which is provided with a guideway 132 for supporting a curling block holder 133. The holder 133 is shaped in the form of a channel, the rear side of which is dove-tailed. A lining member 134 and a gib plate 135 are positioned respectively against the bottom and rear side of the channel. Rear and front curling guide blocks 136 and 137, separated by a spacer 138, are positioned in the channel, and are held firmly in place by adjusting bolts 139 threaded through the front wall of the channel.

In the initial curling mechanism (see Fig. 6) the rear guide block 136 extends above the holder 133, and is notched in its upper forward edge to receive a curling block 140 having a curved surface 141 to which the work blank is to be shaped. The curling block 140 is held in place by means of bolts 142 extending through the block 136. The front guide block 137 extends above the holder 133 to the plane of the surface 141, and supports a backing plate 143 near its rear edge. The backing plate 143 may be adjusted by bolts 144 threaded through an upstanding lug 145 on the guide block 137, and may be clamped in adjusted position by bolts 146. It will be seen that the curling block 140, the rear edge of the front guide block 137, and the backing plate 143 constitute an adjustable guideway which is in effect a continuation of the guideway 76. The work blanks 77 are advanced from the last position in the countersinking mechanism to the curling block 140 by the feed bar 89, which reciprocates between the guide blocks 136 and 137.

A die 147 is supported directly over the curling block 140, and is adapted to descend into engagement with the work blank to form the initial part of the curl. In the present instance, this die is adjustably mounted between a pair of vertical guides 148 formed on the front end of a curl lever 149. The die may be adjusted by means of a bolt 150, and is clamped in adjusted position by bolts 151. The lever 149 is pivoted intermediate its ends upon a pin 152 suitably supported by the standard 25; and is provided at its rear end with a cam roller 153 which engages a curl lever cam 154 mounted on the shaft 26. Spring means connected with the lever 149 by a bolt 155 serves to hold the roller 153 in continual engagement with the cam 154, whereby a positive downward movement and a resilient upward movement of the die 147 is provided.

A braking mechanism is provided for clamping the work blank in position on the curling block 140 before the die 147 descends into engagement therewith. This mechanism preferably comprises a lever 156 carrying a roller 157 at its lower end. The lever 156 is rotatably mounted on a shaft 158 which is supported by a bracket 159 adjustably secured to one side of the curl lever 149 by a bolt 160. A spring 161 is wound upon the shaft 158, and engages a stud 162 on the lever 156 to hold the roller 157 in resilient engagement with the work blank during the lower extent of movement of the die 147. The relative downward movement of the roller 157 is limited by an adjusting bolt 163 which is threaded through one of a pair of overlapping ears 164 formed on the lever 156 and bracket 159.

The final curling mechanism (see Fig. 7) comprises a curl slide 165 which is mounted for reciprocation in ways formed in the upper surface of the base casting 23. At its rear end, the slide 165 is provided with a cam roller 166 which engages a cam 167 on the shaft 26. The forward end of the slide 165 is formed with a pair of longitudinal bores 168 wherein are mounted a pair of coil springs 169 which abut against the holder 133 to move the roller 166 resiliently toward the cam 167. Rearward movement of the slide 165 is limited by a lug 170 on the slide which is arranged to engage an adjustable stop 171 supported by a cross member 172. The slide 165 is also provided at its forward end with a raised extension which is formed with a pair of longitudinal guides 173 connected at their rear ends with a cross rib 174. A tool holder 175 is normally clamped between the guides 173, and may be adjusted by turning a bolt 176 threaded through the rib 174. At its forward end, the holder 175 is formed with a lateral shelf 177 on which is supported a curling die 178. The die 178 is formed with longitudinal curling grooves 179 in its front and rear sides, and with inclined surfaces 180 in its upper edges, thereby rendering it reversible. A strap 181 secured to the holder 175 by a bolt 182 engages the front surface 180 to clamp the die 178 firmly in position on the shelf 177.

Secured to the front edge of the holder 175 is a guide plate 183 which overlaps with the front face of the die 178 to the lower edges of the outer groove 179. Preferably the holder 175, and guide plate 183 are formed with complementary serrations 184 which hold the latter against vertical displacement. The guide plate 183 cooperates with one end of the backing plate 143, the rear edge of the front guide block 137, and a second backing plate 185 secured to the guide block 137 to form a continuation of the guideway for the work blanks 77. The work blanks are advanced to the guide plate 183 from the curling block 140 by the feed bar 89.

The transfer mechanism.

Extending across the guide block 137 between the backing plates 143 and 185 and toward the guide plate 183 is a transverse slot 186 which is adapted to receive a pair of transfer fingers 187 for holding the work blank 77 in position during the final curling operation and then transferring it to the trimming mechanism. The fingers 187 are slightly separated by a finger plate 188, and together with the latter are adjustably secured in a split sleeve 189 carried at the end of a transfer arm 190. A bolt 191 threaded through a plate 192 on the front wall of the holder 133 is adapted to abut against the forward end of the finger plate 188, and thus serves as an adjustable stop to limit the forward position of the arm 190 when the fingers 187 have been oscillated into position to receive the work blank.

The transfer arm 190 is mounted on a shaft 194 which is slidably and rotatably supported at its front end by a bracket 195 secured to the front of the extension 131. A rear portion of the shaft 194 is feathered through a gear 196 which is provided with a hub 197 journaled in a bearing 198 on the casting 23. The gear 196 meshes with a rack 199 formed on the forward end of a transfer lever 200. The lever 200 is provided with an elongated hub 201 which is supported between two spaced bearings 202 on the base casting 23. At its rear end, the lever 200 carries a cam roller 203 positioned in engagement with a transfer cam 204 on the shaft 26. A coil spring 205 secured at its upper end to a supporting rod 206 on the frame of the trimming mechanism is attached to the lever 200 by a strap 207, and serves to hold the cam roller 203 in resilient engagement with the cam 204. A guide block 208 is secured to the casting 23, and is provided with an extension 209 for preventing the rack 199 from moving laterally out of engagement with the gear 196. The rack 199 and lever 200 are so constructed that the cam 204 in one revolution will oscillate the transfer arm 190 back and forth through an angle of 180°.

At its rear end, the shaft 194 is rotatably secured to a joint 210 which is pivotally mounted in the forked end of a slide bar 211. An upward extension formed on the rear end of the bar 211 is pivoted to the lower end of the lever 212 suitably supported by a bracket 213. The bar 211 is reciprocated by means of a cam roller 214 which engages a shift cam 215 on the shaft 26. A coil spring 216 is secured at its opposite ends to a lug 217 on the bearing 198 and to the upper end of the lever 212, thereby acting to maintain the cam roller 214 in resilient engagement with the cam 215.

The trimming mechanism.

Referring now particularly to Figs. 12 to 15, the trimming mechanism comprises a base 218 mounted on the base casting 23 and having inclined ways 219 in its front face for guiding a reciprocating punch slide 220 carrying a punch 221. The punch slide is connected to the forward end of a slide arm 222 pivotally supported in the base 218 on a pin 223 by a stud 224 which is adjustably secured to the upper end of the silde by means of an adjusting nut 225. The rear end of the slide arm 222 is pivotally connected with a vertical link 226 mounted at its lower end on an eccentric 227 on the shaft 26.

Mounted in ways 228 on the base casting 23 directly below the slide 220 and punch 221 is a bolster block 229 which may be transversely adjusted by a screw 230 journaled in a bracket 231 secured to the front of the casting 23. The upper surface of the bolster block 228 is inclined rearwardly and downwardly in a plane perpendicular to the slide 220, and is provided with a pair of transverse T-slots 232 which engage bolts 233 for adjustably securing a tool-supporting block 234 in position. To ensure alinement, the slide 220 is movable on a pair of pillar posts 235 extending up from the block 234. A punch block 236 is mounted on the block 234 directly in line with the punch 221, and is formed with a longitudinal groove 237 for receiving the curls of the inverted work blank. In positioning a work blank on the block 236, the transfer fingers 187 are oscillated into a notch 238 in the forward edge of said block, and are then shifted forwardly to release the work blank. An inclined notch 239 in the forward edge of the slide 220 provides clearance for the oscillation of the fingers 187.

Means is provided for removing the work blanks from the punch 221 to which they adhere after the trimming operation. In the present instance, a knock-out 240 is movably mounted in the slide 220 and between the spaced members of the punch 221. A cross bar 241 loosely positioned in a transverse slot 242 in the slide 220 is normally held in its uppermost position by a pair of coiled springs 243 secured to lugs 244 on opposite sides of the slide 220. A pair of adjustable stops 245 are supported on the base 218 at opposite sides of the slide 220, and are arranged to engage the opposite ends of the cross bar 241 near the upper limit of movement of said slide. The bar 241 connecting with the inner end of the knockout 240 moves it outwardly and thus ejects the work blanks into a discharge chute 246.

The discharge chute 246 is periodically moved into a position below the punch 221 to receive the ejected work blank, and is then quickly withdrawn to avoid interfering with the slide 220 in the following trimming operation. The chute is adjustably secured to a bracket 247 which is mounted upon a rock shaft 248 extending across the machine. At its rear end the rock shaft 248 is connected with a lever 249 which in turn is connected by a link 250 to the lower end of a cam roller lever 251. A cam roller 252 carried by the upper end of the lever 251 is held in resilient engagement with a chute cam 253 on the shaft 26 by a coiled spring 254. The cam 253 is constructed and positioned to operate the chute in timed relation to the punch slide 220.

Operation.

In Fig. 16, I have shown one form of hinge blank 77, which is rectangular in shape and has two screw apertures 255 and three curl leaves 256, and which can be conveniently handled in the present machine. It is to be understood, however, that the machine is capable of operating on many other blanks of different shapes and having any other suitable number of screw apertures and curl leaves.

In operation, as many drills 57 as there are screw apertures (two in the present instance) are positioned respectively over the different apertures of each blank for successive positions of the latter. These drills are driven continually by the motor 63, while the cam shaft 26 for operating the other units of the machine is driven by the motor 29.

The feed cam 114 periodically reciprocates the feed bar thereby causing the primary feed finger 91 to eject the lowermost work blank 77 in the magazine 78 into the guideway 76 and advance it into a position with one of its screw apertures directly below the first drill 57, and causing the secondary feed fingers 92 to advance the preceding work blanks one step along said guideway.

Directly after each forward stroke of the feed bar 89, the blanks beneath the drills 57 are clamped in place by the brake arms 116, and the blank on the curling block 140 is engaged by the roller 157 to prevent displacement thereof during the withdrawal of the feed bar and the operation to follow. On the back stroke of the feed bar, the secondary feed fingers are deflected downwardly and pass underneath the work blanks directly behind.

After each advance of the work blanks, the carriage 32 and drills 57 are lowered by the cam 50 to countersink the screw apertures. The cams 154 and 167 actuate the lever 149 and slide 165 respectively to form the initial and final parts of the curls. These operating parts must necessarily be actuated in timed relation to the movements of the feed bar 89.

It will thus be seen that a work blank is periodically fed into the guideway 76, and is then advanced from one position into another to be operated upon selectively by the successive drills and curling dies in the countersinking and curling mechanisms. Figs. 17 and 18 show the work blank as it appears after the countersinking operation, and Figs. 19 and 20 show it as it appears after the initial part 257 of each curl has been formed.

In the secondary curling mechanism, the feed bar 89 moves the work blank laterally between the feed fingers 187 which serve to hold said blank during the final curling operation. The shaft 194 is then rotated by the cam 204 to oscillate the transfer arm 190 into a position above the bolster block 229 of the trimming mechanism, and near the end of such oscillation is shifted rearwardly to bring the curls of the inverted work blank into the groove 237. After the blank is so positioned, the shaft is shifted forwardly to draw the fingers 187 away, and is then rotated to return said fingers to the curling mechanism.

The eccentric 227 now lowers the slide 220 and punch 221 to shear the ends of the curls. The blank adheres to the punch 221, and is raised therewith until it is ejected by the knock-out 240. The discharge chute 246 is moved into a position beneath the punch 221 to receive the work blank, and is then returned into its inoperative position. It will be seen that the movements of the transfer arm must be timed with respect to those of the curl slide 165 and punch slide 220. Figs. 21 and 22 show the completed hinge blank as it appears when delivered from the machine.

The machine herein disclosed is completely automatic in operation, thereby obviating manual handling of the work blanks. It is rapid and efficient in operation, and consequently adapted for quantity production. The construction is also comparatively simple and sturdy, the parts being coordinated and arranged to operate in synchronism.

I claim as my invention:

1. A machine of the class described having, in combination, a countersinking mechanism, a primary curling mechanism, a secondary curling mechanism, a support constituting a guideway for the work blanks, feeding means for advancing said work blanks along said guideway to be operated upon successively by said mechanisms, a trimming mechanism, means for transferring said work blanks from said guideway to said trimming mechanism, a power shaft, and cam means on said shaft constructed and arranged to operate the different mechanisms in timed relation to each other whereby to perform a sequence of operations on said blanks.

2. A machine of the character disclosed having, in combination, a base, a countersinking mechanism having a plurality of constantly driven drills mounted on one end of said base, means for reciprocating said drills vertically, a primary curling mechanism for forming the initial part of each curl supported on said base next to said countersinking mechanism, a secondary curling mechanism for forming the final part of each curl positioned on said base next to said primary curling mechanism, a work support supported by said base and constituting a guideway for the work blanks, a magazine mounted on one end of said work support, a feeding mechanism arranged to eject the lowermost work blank from said magazine into the guideway and then to advance it step by step along said guideway to be operated on successively by the drills in said countersinking mechanism and said curling mechanisms, a trimming mechanism supported on the other end of said base and adapted to trim the edges of the curls on each blank, means for transferring the work blanks from said secondary curling mechanism to said trimming mechanism and inverting said blank in the course of said transfer, a discharge chute arranged to periodically move into position to receive the finished work blank, and power means for operating said different working elements in timed relation to successively countersink the bores in said blank, form the curls in two steps, trim the edges of said curls, and then discharge the blanks from the machine.

3. A machine of the character described having, in combination, a base, front and rear guide blocks mounted in parallel spaced relation on said base, a pair of guide strips adjustably mounted on the upper adjacent inner edges of said guide blocks, said guide strips and said guide blocks cooperating to define two parallel opposed grooves adapted to receive and support the edges of a plurality of work blanks, means for clamping said guide strips in position, a reciprocable member mounted snugly between said guide blocks for feeding said work blanks step by step along said guideway, and means for operating on said work blanks.

4. A machine of the character described, having, in combination, a base, a countersinking mechanism mounted on said base for countersinking the bores in the work blanks, a curling mechanism mounted on said base for forming a curl on each of said work blanks, a trimming mechanism mounted on said base for trimming the ends of said curls, means for feeding a continuous series of work blanks step by step through the machine, a discharge chute arranged to move into a position to receive said work blanks after the trimming operation, a power shaft journaled on said base, and a plurality of cams on said shaft operatively connected with the above operating units and arranged and constructed to operate them in timed relation to perform a sequence of operations upon each blank.

5. A machine of the character described having, in combination, a guideway adapted to receive a series of work blanks, means for periodically feeding said blanks along said guideway, a plurality of fingers for engaging said blanks selectively in different positions along said guideway, means for moving said fingers out of engagement with the work blanks to permit said blanks to be fed from one position to another, and for moving said fingers into engagement with said work blanks after each feeding movement, and means for operating on said work blanks when the latter are clamped in position by said fingers.

6. A machine of the character described having, in combination, a base having a vertical standard on one end, a drill head comprising a plurality of drills mounted for vertical reciprocation on said standard, a primary curling mechanism mounted on said base next to said standard for forming the initial part of a curl on the work blanks, a secondary curling mechanism mounted on said base next to said primary curling mechanism, a work table supported by said base below said drill head and said curling mechanisms and constituting a guideway for the work blanks, a magazine supported on one end of said work table, feeding means for periodically ejecting a work blank from said magazine and advancing it step by step along said guideway to be operated upon progressively by the drills in said countersinking mechanism and the curling mechanisms, and power means for automatically operating the different operating elements in timed relation to each other.

7. A machine of the character described comprising, in combination, a base, a curling mechanism mounted on said base, a work support constituting a guideway through said curling mechanism, a trimming mechanism supported on said base, means for transferring work blanks from said curling mechanism to said trimming mechanism and inverting them during said transfer, a shaft mounted on said base, and a plurality of cams on said shaft for operating said transferring means.

8. A machine of the character described comprising, in combination, a base, a primary curling mechanism mounted on said base for forming the initial part of a curl on a work blank, a secondary curling mechanism for completing said curl, means for feeding said work blank through said mechanisms, a trimming mechanism mounted on said base for trimming the ends of said curls, means for feeding said work blank from said secondary curling mechanism to said trimming mechanism, and a single power means for operating said mechanisms and means in timed relation to each other.

9. A machine of the class described having, in combination, a base having a vertical standard on one end, and a horizontal knee on its front side, a drill head mounted for vertical reciprocation on said standard, front and rear guide blocks mounted on said knee in parallel spaced relation, a pair of guide strips mounted on the adjacent edges of said guide blocks, said guide strips and guide blocks cooperating to form a guideway adapted to receive and support a series of work blanks, a magazine mounted on one end of said guide blocks, a feeding mechanism mounted on said knee and comprising a reciprocable feed bar mounted for movement between said guide blocks and carrying a plurality of feed fingers for periodically ejecting a work blank from said magazine into said guideway and step by step advancing said work blank along said guideway to be operated upon successively by the different drills in the drill head, a power shaft supported by said base casting, and means connecting said power shaft to said feeding mechanism and said drill head to operate them in timed sequence.

10. A machine of the character described having, in combination, a base, an operating mechanism mounted on said base, a knee formed on the front side of said base, front and rear guide blocks mounted in parallel spaced relation on said knee, guide strips mounted on the upper adjacent edges of said guide blocks, said guide strips and said blocks defining a continuous guideway for the work blanks, a feed bar mounted for reciprocation between said guide blocks, a magazine supported above said guide blocks, a main feed finger carried by said feed bar for periodically ejecting the undermost work blank from said magazine, a plurality of secondary feed fingers carried by said feed bar for advancing said work blank step by step along said guideway, and means for reciprocating said feed bar.

11. A device of the character described comprising, in combination, a base, an operating element mounted on said base, a work support mounted on said base and constituting a continuous guideway for a series of work blanks, a reciprocable feed bar movable along said work support, said bar having a plurality of cut-out portions each of which is formed with a circular opening in one end and with a projection at the other end, a plurality of feed fingers each having a circular end pivotally mounted in one of said openings for advancing said work blanks incrementally along said guideway, said projections on said feed bar being positioned to engage the free ends of said fingers to limit the outward movement thereof, springs tending to move said fingers outwardly, means for reciprocating said feed bar, and means for adjusting the position of said reciprocation.

12. A device of the class described having, in combination, a support, a pair of spaced guide blocks mounted on said support, said guide blocks constituting a guideway for a series of work blanks, a feed bar reciprocable between said guide blocks, a plurality of spring pressed feed fingers carried by said feed bar for advancing said work blanks along said guideway, and means for individually clamping said work blanks in position directly after each advance, said spring pressed fingers being adapted to slide beneath said work blanks in their rearward movement.

13. A machine of the character described having, in combination, a base, front and rear guide blocks mounted on said base, means for feeding a work blank along said guide blocks, a curling block supported at one end of the rear guide block and adapted to receive a work blank, a curling lever mounted on said base and carrying a die at its front end directly above said curling block, means for oscillatnig said lever to lower said die into engagement with said work blank to form the initial part of the curl, a pair of backing plates mounted on the front guide block for positioning said work blank, a curl slide mounted on said base and carrying a die at its front end, a guide plate carried by said curl slide and arranged to receive the work blank from said curling block, and means for reciprocating said slide.

14. A machine of the character described, having, in combination, a work support constituting a guideway for a work blank, a curl slide, a curling tool carried by said slide for engaging said work blank, and a transfer mechanism comprising a pair of transfer fingers arranged to engage said work blank and remove the latter from said guideway.

15. A machine of the character described having, in combination, a base, a pair of operating units for performing successive operations upon a work blank, a transfer mechanism for transferring said work blank from one unit to the other, said mechanism comprising a reciprocable and rotatable shaft, a transfer arm carried by said shaft, a pair of spring transfer fingers carried by said arm, means for revolving said shaft to oscillate said arm from one unit to the other, means for reciprocating said shaft to move said work blank into position in one unit, and to then shift said fingers out of engagement with said work blank, and a single power means for operating said units and said shifting mechanism in timed sequence.

16. A machine of the character described having, in combination, an operating unit, a receptacle for discharging work blanks from said unit, a power means for actuating said operating unit and for periodically moving said discharge receptacle into a position to receive the work blanks, said unit and said discharge receptacle being operated in timed relation.

17. A machine of the character described having, in combination, a frame, a tool slide mounted for reciprocation on said frame, said tool slide acting to retain the work blank after each operation, a discharge chute supported adjacent said work slide, power means for periodically oscillating said discharge chute into a position beneath said tool slide to receive said work blank, and knock-out means for ejecting said work blank from said tool slide into said chute, said power means being arranged to actuate said chute in timed relation to the movements of said tool slide.

18. A machine of the character described having, in combination, a base, a mechanism on said base for forming a curl on a work blank, a rotary shaft mounted next to said mechanism and carrying a pair of fingers, means for positioning said fingers within said mechanism to receive said work blank and support it during the curling operation, and a second mechanism mounted on said base for trimming the ends of said curls, said positioning means being constructed to oscillate said fingers with said work blank from the first mechanism into position in said second mechanism.

19. A machine of the character described having, in combination, a base, a pair of operating units mounted on said base for performing successive operations upon a work blank, a rock shaft mounted between said units, a transfer arm carried by said rock shaft, a pair of transfer fingers supported by said arm for engaging said blank, a power shaft supported on said base, means connected with said power shaft for actuating said operating units, means connected with said power shaft for rotating said rock shaft to oscillate said transfer fingers from one unit to the other, and means connected with said power shaft for shifting said rock shaft longitudinally when said transfer fingers are positioned within one of said operating units.

20. A machine of the character described having, in combination, a rock shaft, a pair of transfer fingers carried by said rock shaft for oscillation from one point to another, a gear feathered on said rock shaft, a lever having a rack segment in engagement with said gear for rotating said shaft to oscillate said fingers, a draw bar flexibly connected with the rear end of said shaft, and a single power means for oscillating said lever and for actuating said drawbar in timed relation to oscillate and to shift said rock shaft.

21. A machine of the character described having, in combination, a work table constructed to form a continuous guideway for a series of work blanks, a feed bar reciprocable within said guideway, a magazine containing a stack of work blanks supported above said guideway, a primary feed finger mounted in said feed bar and arranged to eject the lowermost work blank from said magazine into said guideway at each forward reciprocation of said feed bar, a plurality of secondary feed fingers mounted in uniformly spaced positions in said feed bar ahead of said primary feed finger, and spring means normally tending to hold said secondary feed fingers in their uppermost position, said feed fingers being constructed to engage said work blanks on the forward stroke of said feed bar to advance said blanks along said guideway, and to be deflected downwardly and pass underneath the following work blanks on the rearward stroke of the feed bar.

22. In a machine of the character described having, in combination, a base, an operating unit mounted on said base, a work table supported on said base and providing a guideway for the passage of a series of work blanks, a feed bar mounted for reciprocation in said guideway to advance said work blanks after each operation, a rock shaft mounted on said base above said work table, a plurality of braking fingers carried by said rock shaft for selectively engaging said work blanks immediately after each forward stroke of said feed bar, and power means for operating said unit, feed bar and rock shaft in timed relation to each other.

23. A machine of the character described having in combination, a base, a guideway on said base, said guideway being adapted to receive a plurality of work blanks, means for periodically feeding said work blanks in series and step by step along said guideway, a plurality of clamping members for selectively clamping said series of work blanks in position on said guideway, spring means tending to move said clamping members into engagement with said blanks, power means for alternately actuating said feeding means to advance said work blanks and said clamping members to release said work blanks to permit said feeding movement, and means for operating on said work blanks when the latter are clamped in position by said members.

24. A machine of the class described having, in combination, a base having a vertical standard, a horizontal guideway on said base, said guideway being adapted to receive a plurality of work blanks, vertical ways on said standard, a carriage slidably mounted on said ways, a plurality of drill spindles mounted in said carriage, a driving mechanism on said standard, extensible means connecting said drill spindles to said driving mechanism, a bar adjustably connected to said carriage, a drive cam, means connected to said bar and having a part coacting with said cam for reciprocating said carriage, and spring means tending to raise said carriage to hold said part against said cam.

In testimony whereof, I have hereunto affixed my signature.

WILHELM G. ALDEEN.